United States Patent [19]

Ishii

[11] Patent Number: 4,844,261
[45] Date of Patent: Jul. 4, 1989

[54] FLOPPY DISC CASE ASSEMBLY OF SMALL SIZE

[75] Inventor: Kuniaki Ishii, Tokyo, Japan

[73] Assignees: King Jim Co., Ltd.; B.S Computer Service Co., Ltd., both of Tokyo, Japan

[21] Appl. No.: 190,241

[22] Filed: May 4, 1988

[30] Foreign Application Priority Data

Feb. 10, 1988 [JP] Japan .............................. 63-16976[U]

[51] Int. Cl.$^4$ ............................................ B65D 85/57
[52] U.S. Cl. .................................. 206/444; 206/45.17
[58] Field of Search ............. 206/311, 444, 555, 44 B, 206/45.17, 45.23

[56] References Cited

U.S. PATENT DOCUMENTS

| | | | |
|---|---|---|---|
| 4,356,918 | 11/1982 | Kahle et al. ......................... | 206/444 |
| 4,478,335 | 10/1984 | Long et al. .......................... | 206/444 |
| 4,496,050 | 1/1985 | Kirchner et al. ................... | 206/444 |
| 4,586,603 | 5/1986 | Long et al. ...................... | 206/444 X |
| 4,634,001 | 1/1987 | Wakelin .......................... | 206/444 X |
| 4,766,999 | 8/1988 | Kin-Shon ........................ | 206/444 X |

Primary Examiner—Allen M. Ostrager
Attorney, Agent, or Firm—Wegner & Bretschneider

[57] ABSTRACT

A floppy disc case assembly comprises a first member, a second member and a pivotal member, the second member being provided on its both sides with pivot bearings including center through-holes, which are fitted into holes formed in the first member, and the through-holes further receiving pivots formed on the pivotal member, whereby the three members can be firmly assembled together. Projecting pieces formed on both sides of the pivotal member are engaged within recesses formed inside both side walls of the second member.

1 Claim, 2 Drawing Sheets

FLOPPY DISC CASE ASSEMBLY OF SMALL SIZE

BACKGROUND OF THE INVENTION

1. Field of the Invention

This invention relates to a floppy disc case assembly of small size, which is formed of thin sheets of hard plastics.

2. Statement of the Prior Art

Floppy disc cases, now commercially available, are of relatively large size and comprise thick parts or members. The members are combined with each other for pivotal movement, and are designed in such a manner that their pivotal movement is limited to a certain extent by a protuberance or the like, which may be provided on only one of said members.

When forming a small-sized floppy disc case of thin sheet members, difficulties are encountered both in pivotally supporting them with respect to each other and in limting their pivotal movement by means of a protuberance.

SUMMARY OF THE INVENTION

A primary object of this invention is to eliminate such difficulties as mentioned above in connection with the prior art small-sized case for floppy discs.

According to this invention, this object is achieved by the provision of a floppy disc case assembly comprises a first member, a second member and a pivotal member, said second member being provided on its both sides with pivot bearings including center through-holes, which are fitted into holes formed in said first member, and said through-holes further receiving pivots formed on said pivotal member, whereby said three members can be firmly assembled together. Projecting pieces formed on both sides of the pivotal member are engaged within recesses formed inside both side walls of the second member.

DETAILED DESCRIPTION OF THE PREFERRED EMBODIMENTS

Figure 1:
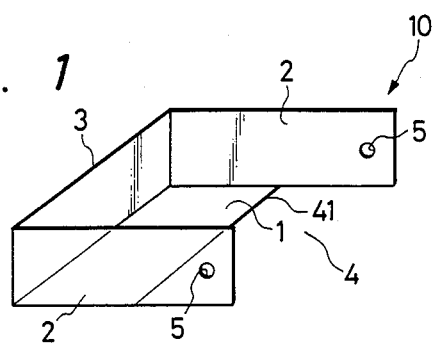
FIG. 1 shows the first member.

FIG. 1 is a perspective view of a first member 10 including an upper wall 1, outer side walls 2 and 2, a front wall 3 and a space 4 through which a second member to be described later is pivotally movable holes 5 are formed in the side walls 2 and 2.

Figure 2:
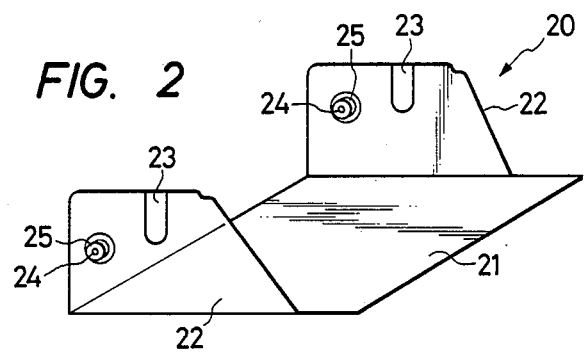
FIG. 2 shows the second member.

FIG. 2 shows a second member 20 including a bottom wall 21, inner side walls 22 and 22 recessed at 23 and 23, and pivot bearings 25 and 25, each being provided with a center through-hole 24.

Figure 3:
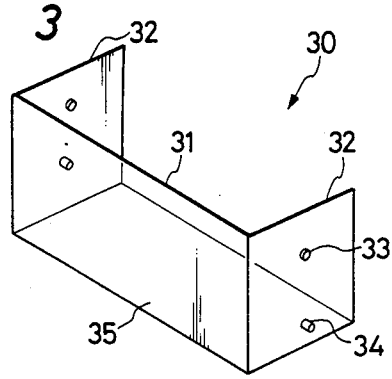
FIG. 3 shows the pivotal member.

FIG. 3 illustrates a pivotal member 30 including a front wall 31, side walls 32 and 32 each having a projecting piece 33 and a pivot 34, and a bottom wall 35.

Figure 4:
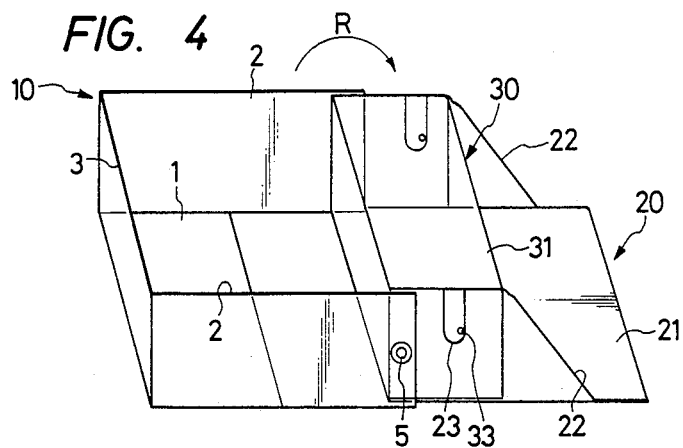
FIG. 4 shows an assembly of the three members.

FIG. 4 shows an assembly of the three members, wherein the pivots 34 of the pivotal member 30 are fitted from inside into the center through-holes 24 in the inner side walls 22 of the second member to combine together the pivotal and second members 30 and 20 for pivotal movement. The projecting pieces 33 are then engaged within the recesses 23 formed in the inner side walls 22.

In this state, the pivot bearings 25 are fitted into the holes 5 from inside the outer side walls 2 and 2 of the first member 10.

Figure 5:
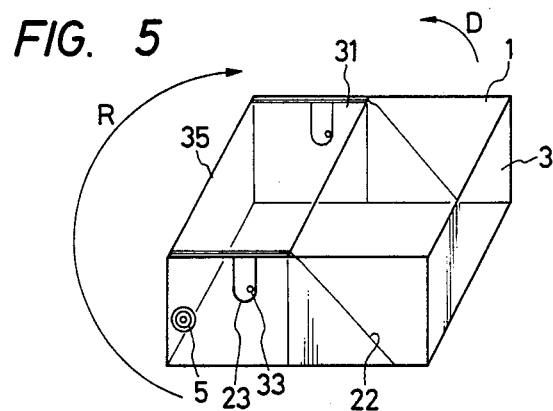
FIG. 5 shows that assembly which is lidded to store floppy discs.

FIG. 5 illustrates the floppy disc case assembly of this invention, wherein the first member 10 is turned 180° from the position of FIG. 4 to the storage position, as shown by an arrow R.

Figure 6:
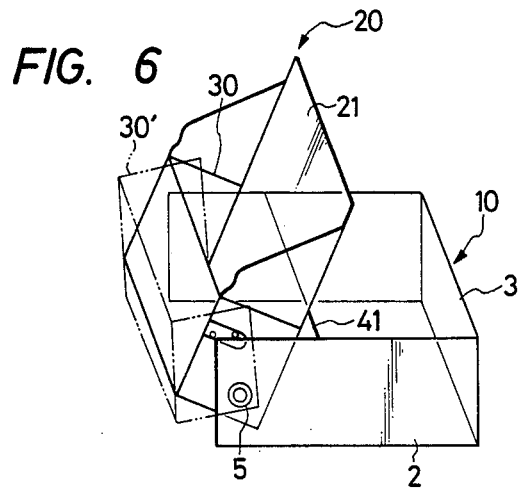
FIG. 6 shows the floppy disc case assembly which stands erect for use.

FIG. 6 illustrates the floppy disc case assembly which is standing erect, while a floppy disc is used, wherein the first member 10 is turned 270° or more from the position of FIG. 5 in the direction shown by arrow R (in other words, turned 90° or more from the position of FIG. 4 in the direction shown by an arrow D), until the side edge 41 of the upper wall 1 abuts against the lower portion of the bottom wall 21 of the second member 20. The state of FIG. 6 is now achieved by keeping the first member 10 with the upper wall 1 being upside down. Alternatively, while the side walls 2 of the first member 10 are slightly lifted up from the state of FIG. 5, the second member 20 may be turned in the direction shown by arrow R until the bottom wall 21 abuts against the side edge 41.

As can be seen from the illustrated embodiment, floppy discs are stored in a space defined by the front and bottom walls 31 and 35 of the pivotal member 30, the bottom wall 21 of the second member 20 and so on.

For easy insertion or removal of floppy discs, the pivotal member 30 is turned forward around the pivots 34 fitted into the center through-holes 24, as shown by a two-dotted line 30' to make the front wall 31 nearly upright. At this time, the projecting pieces 33 formed on the side walls 32 of the pivotal member 30 move about within the recesses 23 formed in the side walls 22 of the second member to prevent further pivotal movement of the pivotal member 30 where the projecting pieces 33 abut against the lower edges of the recesses 23. Since the conventional small-sized floppy disc case is thin, it is likely that locking may be uncertain because of the length of contact of a projecting piece corresponding too 33 with the lower edges of a recess corresponding to 23 being short. In this invention, however, locking can be assured by the provision of such projecting pieces on both sides.

According to the floppy disc case assembly constructed as mentioned above, the three members are assembled in the compact form around the pivot bearings which includes the center through-holes and are formed on the side walls of the second member. Accordingly, even when formed into a thin floppy disc case assembly, the three members can pivotally be assembled together in a firm manner.

Moreover, pivotal movement of the pivotal member can be surely locked, even when the floppy disc case is thin, since stoppers are provided on its both sides.

What is claimed is:

1. A floppy disc case assembly of small size formed of a thin sheet of hard plastics or the like, which comprises:

a first member 10 including an upper wall 1, outer side walls 2 on its both sides and a front wall 3, a second member 20 including a bottom wall 21 and inner walls 22 on its both sides, and a pivotal member 30 including a front wall 31, side walls 32 on its both sides and a bottom wall 35;

said outer walls 2 being provided with holes 5 for receiving pivot bearings which are formed on said inner walls 22 and include center through-holes 24;
said first member 10 being combined with said second member 20 for pivotal turning;
pivots 34 provided on said side walls 32 for fitting into said center through-holes 24, whereby said pivotal member 30 is combined with said first and second members 10 and 20 for pivotal turning with respect thereto; and
projecting pieces 33 formed on said sides walls 32 for engagement within recesses 23 formed on the inside of said side walls 22.

* * * * *